United States Patent [19]
Ohsawa et al.

[11] Patent Number: 5,994,464
[45] Date of Patent: Nov. 30, 1999

[54] CYANOACRYLATE ADHESIVE COMPOSITION

[75] Inventors: Nobuo Ohsawa, Hachioji; Hiroyuki Mikuni, Sagamihara; Tatsuo Fujii, Nagaokakyo; Hiroshi Takeuchi, Toyonaka, all of Japan

[73] Assignee: Three Bond., Ltd., Tokyo, Japan

[21] Appl. No.: 08/866,454

[22] Filed: May 30, 1997

Related U.S. Application Data

[63] Continuation of application No. 08/609,495, Mar. 1, 1996, abandoned.

[30] Foreign Application Priority Data

Mar. 23, 1995 [JP] Japan ................. 7-101554

[51] Int. Cl.$^6$ ............... C09J 151/04; C09J 4/04
[52] U.S. Cl. ................ 525/85; 525/66; 525/71; 525/84; 525/86; 525/87; 525/295
[58] Field of Search ................ 525/66, 71, 84, 525/85, 86, 87, 295

[56] References Cited

U.S. PATENT DOCUMENTS

| | | | |
|---|---|---|---|
| 4,102,945 | 7/1978 | Gleave | 156/331 |
| 4,440,910 | 4/1984 | O'Connor | 525/295 |
| 4,560,723 | 12/1985 | Millet et al. | 524/486 |
| 4,942,201 | 7/1990 | Briggs | 525/85 |
| 5,362,804 | 11/1994 | Oshima et al. | 524/64 |

FOREIGN PATENT DOCUMENTS

| | | |
|---|---|---|
| 53-30643 | 3/1978 | Japan . |
| 63-284279 | 11/1988 | Japan . |
| 240209 | 8/1994 | Japan . |
| 7-331186 | 12/1995 | Japan . |

*Primary Examiner*—David Buttner
*Attorney, Agent, or Firm*—Scully, Scott, Murphy & Presser

[57] ABSTRACT

According to the present invention there is provided a cyanoacrylate adhesive composition having high shear bond strength, peeling bond strength and impact bond strength and superior particularly in hot-cold cycle resistance and heat resistance. The cyanoacrylate adhesive composition contains (a) a cyanoacrylate monomer, (b) an elastomer miscible or compatible with the cyanoacrylate monomer, and (c) a core-shell polymer having a core of a rubbery polymer and a shell of a glassy polymer, the core-shell polymer being compatible but not miscible with the cyanoacrylate monomer.

22 Claims, No Drawings

CYANOACRYLATE ADHESIVE COMPOSITION

This application is a continuation of application Ser. No. 08/609,495, filed Mar. 1, 1996, now abandoned.

BACKGROUND OF THE INVENTION

The present invention relates to a cyanoacrylate adhesive composition superior particularly in heat resistance and hot-cold cycle resistance.

An α-cyanoacrylate adhesive polymerizes and cures rapidly in the presence of trace water absorbed on the surface of a material to be bonded, affording an extremely strong bond in a short time for almost all materials except some inert materials such as polyethylene and Teflon. Because of such a superior property α-cyanoacrylate adhesives are widely in use as instantaneous adhesives of a room temperature setting one-part type for the bonding of metals, plastics, rubber, wood, etc.

However, since cyanoacrylate polymer is a brittle polymer, cyanoacrylate adhesives have the drawback that they are inferior in peeling bond strength and impact resistance. With a view to remedying such a drawback there have been proposed cyanoacrylate adhesive compositions modified with various elastomers, core-shell polymers, adhesives and reinforcing agents.

JP43-29477B discloses a cyanoacrylate adhesive composition containing one or more elastomers selected from (1) the reaction product of polyester and/or polyether and polyisocyanate, (2) acrylonitrile-butadiene rubber having carboxyl group and (3) acrylic ester based polymer.

JP53-30643A discloses a cyanoacrylate adhesive composition improved in peeling strength and containing an elastomer selected from (1) acrylonitrile-butadiene-styrene terpolymer, (2) methacrylate-butadiene-styrene terpolymer and (3) acrylonitrile vinylidene chloride copolymer whose vinylidene chloride content is at least 50 mol %.

JP63-284279A discloses a cyanoacrylate adhesive composition containing a saturated copolyester and improved in peeling bond strength and impact strength.

JP4-75268B discloses a cyanoacrylate adhesive composition containing a copolymer of acrylic ester of methacrylic ester and a lower alkene monomer.

JP5-1831B discloses a cyanoacrylate adhesive composition comprising urethane rubber and pyrogallol and improved in all of tensile shear bond strength, peeling bond is strength, impact peeling bond strength, and resistance to heat, water and moisture.

U.S. Pat. No. 4,102,945 discloses a cyanoacrylate adhesive composition containing a core-shell copolymer selected from acrylonitrile-butadiene-styrene terpolymer (ABS), methacrylate-butadiene-styrene terpolymer (MBS) and vinylidene chloride-acrylonitrile copolymer (VAC), as an impact resistance improver for polyvinyl chloride resin.

U.S. Pat. No. 4,560,723 (JP5-59949B) discloses a cyanoacrylate adhesive composition comprising a core-shell copolymer as a reinforcing agent which has been freed from impurities causing premature polymerization of a cyanoacrylate adhesive and an agent for the prevention of heat aging.

For adhesives used to bond mechanical parts and the like which are used in outer environments it has been considered necessary to have not only a high bond strength in normal state but also a high adhesive force even against changes in atmospheric temperature caused by the difference in temperature between daytime and night, change of season, etc. But conventional cyanoacrylate adhesive compositions do not fully satisfy these characteristics required.

Accordingly, it is the object of the present invention to provide a cyanoacrylate adhesive composition which satisfies the above characteristics required.

Having made studies earnestly to achieve the above-mentioned object, the present inventors found out that a cyanoacrylate adhesive composition containing an elastomer and a core-shell polymer not only possesses high shear adhesive force, peeling bond strength and impact adhesive force but also exhibits an outstanding effect of improvement particularly in hot-cold cycle resistance and heat resistance.

SUMMARY OF THE INVENTION

The cyanoacrylate adhesive according to the present invention is characterized by containing (a) a cyanoacrylate monomer, (b) an elastomer miscible or compatible with the cyanoacrylate monomer, and (c) a core-shell polymer having a core of a rubbery polymer and a shell of a glassy polymer and being compatible but not miscible with the cyanoacrylate monomer.

DETAILED DESCRIPTION OF THE INVENTION

The present invention will be described in detail hereinafter.

The cyanoacrylate monomer as the first ingredient of the cyanoacrylate adhesive composition according to the present invention is a compound known well as an α-cyanoacrylate and represented by the following general formula:

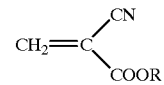

where R is an ester residue such as alkyl, cycloalkyl, alkenyl, cycloalkenyl, alkynyl, phenyl, or aryl. The number of carbon atom of the ester residue is not specially limited, but there usually is employed a hydrocarbon group having 1 to 8 carbon atoms. A substituted hydrocarbon group such as alkoxyalkyl or trialkylsilylalkyl is also employable as the ester residue.

As examples of the cyanoacrylate monomer are mentioned alkyl and cycloalkyl α-cyanoacrylates such as methyl α-cyanoacrylate, ethyl α-cyanoacrylate, propyl α-cyanoacrylate, butyl α-cyanoacrylate, and cyclohexyl α-cyanoacrylate, alkenyl and cycloalkenyl α-cyanoacrylates such as allyl α-cyanoacrylate, methallyl α-cyanoacrylate, and cyclohexenyl α-cyanoacrylate, alkynyl α-cyanoacrylates such as propargyl α-cyanoacrylate, aryl α-cyanoacrylates such as phenyl α-cyanoacrylate and toluyl α-cyanoacrylate, hetero atom-containing methoxyethyl α-cyanoacrylate, ethoxyethyl α-cyanoacrylate, furfuryl α-cyanoacrylate, silicon atom-containing trimethylsilylmethyl α-cyanoacrylate, trimethylsilylethyl α-cyanoacrylate, trimethylsilylpropyl α-cyanoacrylate and dimethylvinylsilylmethyl α-cyanoacrylate.

The second ingredient of the cyanoacrylate adhesive composition according to the present invention is an elastomer which is miscible or compatible with the cyanoacrylate monomer. The terms "miscible" or "miscibility" and "compatible" or "compatibility" are commonly used in the polymer alloy field. The former represents a state wherein the elastomer and the cyanoacrylate monomer are mixed microscopically, namely, on a molecular level, while the latter represents a state wherein the elastomer is stably dispersed macroscopically in the cyanoacrylate monomer [see, for example, "Polymer Alloy—Basis and Application", edited by Kobunshi Gakkai, published by Tokyo Kagaku Dojinsha, (2nd Edition, Apr. 16, 1993)]. As the elastomer in question they may be used any of those illustrated in the foregoing prior art literatures.

For example, there may be used an elastomer prepared by copolymerizing a lower alkene or a conjugated diene with a monomer copolymerizable therewith such as, for example, an aromatic vinyl or vinylidene monomer, e.g. styrene, vinyltoluene, or α-methylstyrene, a vinyl or vinylidene cyanide monomer, e.g. acrylonitrile or methacrylonitrile, or an alkyl methacrylate monomer, e.g. methyl methacrylate or butyl methacrylate. Examples of such elastomer include acrylonitrile-butadiene-styrene terpolymer, methacrylate-butadiene-styrene terpolymer, methyl acrylate-ethylene copolymer, acrylonitrile-butadiene copolymer, and acrylonitrile-isoprene copolymer.

As further examples are mentioned polyurethane elastomers obtained by the polyaddition of isocyanate compounds and diol compounds, as well as polyester elastomers obtained by the polycondensation of dibasic, aliphatic or aromatic carboxylic acids and diols.

These elastomers may be used each alone or as a mixture of two or more. It is preferred that the glass transition temperature (Tg) of the elastomer used be below −10° C. A glass transition temperature (Tg) above the said temperature may bring about no improvement in adhesiveness. The elastomer used in the invention is wholly elastomeric substantially, and as a matter of course, those having the shell phase of glassy polymers are not included as examples of the elastomer.

The amount of the elastomer to be used differs depending on the kind of the elastomer, but is usually in the range of 0.5 to 30 parts by weight, preferably 1 to 20 parts by weight. If it is smaller than 0.5 part by weight, no improvement in adhesiveness may be recognized in the resulting adhesive composition when cured, and a larger amount of the elastomer than 30 parts by weight may result in that such cured adhesive composition is greatly impaired in rigidity and heat resistance.

The third ingredient of the cyanoacrylate adhesive composition according to the present invention is a core-shell polymer having a core of a rubbery polymer and a shell of a glassy polymer and being compatible but not miscible with the cyanoacrylate monomer. Preferably, the core phase and the shell phase of the core-shell polymer are grafted to each other. Preferably, such a core-shell polymer is prepared by a continuous, multi-step emulsion polymerization method, what is called a multi-step seed emulsion polymerization method, wherein the polymer in a posterior step is subjected to seed polymerization successively in the presence of the polymer of a prior step. First, seed latex is prepared by emulsion polymerization, then a core portion is prepared by seed polymerization, and further the seed polymerization is repeated, whereby a core-shell polymer can be obtained. The following description is now provided about a preferred process for preparing such core-shell polymer.

First, the polymerization of seed particles is performed by adding the whole amount of a monomer which is selected according to required characteristics. Often used as the monomer is methyl methacrylate or ethyl acrylate.

The polymerization for the core is carried out by emulsion-polymerizing a conjugated diene or an alkyl acrylate monomer wherein the alkyl group has 2 to 8 carbon atoms, or a mixture thereof, in the presence of seed latex, to prepare as a core constituting polymer a rubbery polymer having a glass transition temperature (Tg) below room temperature, preferably below −10° C. if the glass transition temperature of the core is above room temperature, it may result in loss of the characteristics of rubber particles.

As the conjugated diene used in the emulsion polymerization for the core there may be used, for example, butadiene, isoprene, or chloroprene, with butadiene being particularly preferred. On the other hand, as the alkyl acrylate referred to above wherein the alkyl group has 2 to 8 carbon atoms, there may be used, for example, ethyl acrylate, propyl acrylate, butyl acrylate, cyclohexyl acrylate, or 2-ethylhexyl acrylate, with butyl acrylate being particularly preferred.

In the copolymerization for the core, together with the alkyl acrylate there may be used a monomer copolymerizable therewith, examples of which include aromatic vinyl and vinylidene monomers such as styrene, vinyltoluene, and α-methylstyrene, vinyl cyanide and vinylidene cyanide monomers, such as acrylonitrile and methacrylonitrile, and alkyl methacrylates such as methyl methacrylate and butyl methacrylate.

In the polymerization for the core it is desirable to use a crosslinkable monomer and a graft monomer as comonomers.

As examples of the crosslinkable monomer just referred to above there are mentioned aromatic divinyl monomers such as divinylbenzene, as well as alkane polyol polyacrylates or alkane polyol polymethacrylates such as ethylene glycol diacrylate, ethylene glycol dimethacrylate, butylene glycol diacrylate, hexanediol dimethacrylate, oligoethylene glycol diacrylate, oligoethylene glycol dimethacrylate, trimethylolpropane diacrylate, trimethylolpropane dimethacrylate, trimethylolpropane triacrylate, and trimethylolpropane trimethacrylate. Particularly, butylene glycol diacrylate and hexanediol diacrylate are preferred.

It is preferable that the crosslinkable monomer exemplified above be used in an amount ranging from 0.2 to 4.0 wt % of the total monomer quantity used in the polymerization for the core.

As examples of the graft monomer are mentioned unsaturated carboxylic acid allyl esters such as allyl acrylate, allyl methacrylate, diallyl maleate, diallyl fumarate, and diallyl itaconate, with allyl methacrylate being particularly preferred.

It is desirable to use the graft monomer in an amount ranging from 0.2 to 5.0 wt % of the total monomer quantity used in the polymerization for the core.

If the amount of the crosslinkable monomer and that of the graft monomer are outside the respective ranges mentioned above, the compatibility of the core-shell polymer with the cyanoacrylate may be impaired, or the effect of improving the bond strength may be unsatisfactory. If their amounts are larger than the said ranges, it may become difficult to take out the core-shell polymer by a freezing method.

It is preferable that the proportion of the rubbery polymer core be in the range of 50 to 90 wt % of the whole of the core-shell polymer. A smaller proportion of the core than this range may result in unsatisfactory effect of improving the adhesiveness.

If the proportion of the core exceeds 90 wt %, the shell cannot cover the core to a complete extent, and there will occur fusion-bonding and agglomeration of the core-shell polymer. This may result in impairment of the compatibility of the core-shell polymer with the cyanoacrylate or impairment of the reproducibility of the adhesiveness improving effect.

In the preparation of the core-shell polymer, as a polymerization initiator to be used in the foregoing monomer emulsion polymerization there may be used, for example, any of persulfate initiators such as sodium persulfate and potassium persulfate, azo type initiators such as azobisisobutyronitrile, 2,2'-azobis(2-amidinopropane) dihydrochloride, 2,2'-azobis (2-imidazoline-2-yl)propane, and dimethyl methylpropaneisobutyrate, and organic peroxide initiators such as cumene hydroperoxide and diisopropyl-benzene hydroperoxide. As examples of a surface active agent employable in the polymerization are mentioned anionic surfactants such as sodium dodecylbenzensulfonate and sodium dioctylsulfosuccinate, and non-ionic surfactants such as polyoxyethylene nonyl phenyl ether and polyoxyethylene monostearate.

Next, the glassy polymer shell is prepared in the following manner. After preparation of the core latex in the above manner, methyl methacrylate or styrene and a monomer copolymerizable therewith are polymerized in the presence of the core latex to form a glassy polymer having a glass transition temperature (Tg) above room temperature, preferably above 60° C., as an outermost shell.

As examples of the monomer copolymerizable with methyl methacrylate are mentioned vinyl polymerizable monomers such as alkyl acrylates, e.g. ethyl acrylate and butyl acrylate, alkyl methacrylates, e.g. ethyl methacrylate and butyl methacrylate, aromatic vinyl and vinylidene monomers, e.g. styrene, vinyltoluene and α-methylstyrene, and vinyl cyanide and vinylidene cyanide monomers, e.g. acrylonitrile and methacrylonitrile. Particularly preferred are ethyl acrylate, styrene and acrylonitrile. As examples of the monomer copolymerizable with styrene are mentioned vinyl polymerizable monomers such as alkyl acrylates, e.g. methyl acrylate and ethyl acrylate, alkyl methacrylates, e.g. methyl methacrylate and ethyl methacrylate, aromatic vinyl and vinylidene monomers, e.g. vinyltoluene and α-methylstyrene, and vinyl cyanide and vinylidene cyanide monomers, e.g. acrylonitrile and methacrylonitrile, with methyl methacrylate and acrylonitrile being particularly preferred.

Also in the polymerization for the shell, the use of a crosslinkable monomer in a small amount as a comonomer may bring about a higher adhesive force. As the crosslinkable monomer, if any of the crosslinkable monomers exemplified above in connection with the polymerization for the core is used in an amount below 4.0 wt % of all the monomer quantity used in the polymerization for the shell, there will be attained an outstanding effect.

It is preferable that the proportion of the shell phase be in the range of 10 to 50 wt % of the whole of the core-shell polymer. If the proportion of the outermost shell is smaller than this range, it will be impossible for the shell to cover the core in a complete manner and there will occur fusion-bonding and agglomeration of the core-shell polymer. This may result in that the compatibility of core-shell polymer with the cyanoacrylate is impaired or the reproducibility of the adhesiveness improving effect is deteriorated.

If the proportion of the shell exceeds 50 wt %, the adhesive obtained by using the resulting core-shell polymer may be unsatisfactory in the adhesiveness improving effect.

In the core-shell polymer prepared according to the present invention there may be present a polymer layer or layers, namely, intermediate layer or layers, between the core and the final polymer layer, or the shell. After the formation of seed or core, such an intermediate layer can be formed by suitably selecting, for example, a polymerizable monomer containing a functional group such as glycidyl methacrylate or unsaturated carboxylic acid, a polymerizable monomer which forms a glassy polymer such as methyl methacrylate, or a polymerizable monomer which forms a rubbery polymer such as butyl acrylate, and then subjecting the thus-selected monomer to emulsion polymerization.

A suitable composition of the polymer which constitutes such as intermediate layer can be selected from among various compositions, according to desired properties of the resulting core-shell polymer.

Also as to the polymerization ratio of the intermediate layer, it may be determined appropriately according to the characteristics of the constituent polymer, namely, according to the monomer used. For example, in the case where a glassy polymer is used as an intermediate layer, its polymerization ratio may be calculated as part of the shell, while in the case of a rubbery polymer, its polymerization ratio may be calculated as part of the core.

As the structure of a core-shell polymer having such an intermediate layer there is mentioned, for example in the case where an intermediate layer is formed between core and shell by polymerization, a multi-layer structure having another layer, or an intermediate layer, between core and shell or what is called a salami structure as an integral structure of core and intermediate layer wherein an intermediate layer is dispersed as granular domains in the interior of the core. In the core-shell polymer having such a salami structure, in the extreme case the intermediate layer to be dispersed forms a new core in the central portion of the core. The core-shell polymer of such a structure sometimes occurs in the case of using a monomer typified by styrene as an intermediate layer constituting monomer.

The polymerization for the shell and that for the intermediate layer are also performed using the same initiator and surfactant as those used in the polymerization for the core.

The weight average particle diameter of the core-shell polymer prepared as above is usually in the range of 100 to 1,000 nm (0.1 to 1 μm).

The core-shell polymer used in the present invention can be taken out as granules, flakes, or powder, for example by:

(1) preparing latex in accordance with the known seed emulsion polymerization process, using the foregoing surfactant and polymerization initiator;

(2) freezing the latex in an atmosphere held at −5° C.~−40° C. and thereafter melting the frozen latex at 15–60° C.;

(3) subsequently performing a dehydration treatment, followed by drying at 40~80° C., to afford a powder.

By such operations for taking out the polymer it is made possible to remove the bulk of the solvent and surfactant used in the emulsion polymerization.

U.S. Pat. No. 4,560,723 (Japanese Patent Publication No. 59949/1993) refers to ionic substances induced by various additives used in the preparation of such core-shell polymer, as the cause of impairing the shelf life of composition. However, although the core-shell polymer preparing process used in the present invention is the same emulsion polymerization process that used for preparing a core-shell polymer in the above U.S. patent, no influence is recognized in the shelf life of the composition obtained in the present invention.

Although the reason for the above is not clear, it is presumed that the core-shell polymer withdrawing process has a bearing on the shelf life the resulting composition. As core-shell polymer withdrawing processes there are also known a salting-out process and a spray dry process in addition to the freeze-drying process referred to above. But if the freeze-melting process is used, the shelf life of the resulting composition may not be impaired because the amount of residual ionic impurities can be made smaller than in the other polymer withdrawing processes.

The amount of the core-shell polymer to be used is in the range of 3 to 30 parts by weight, preferably 5 to 20 parts by weight, based on 100 parts by weight of cyanoacrylate. If the amount of the core-shell polymer is smaller than 3 parts by weight, a cured matter of the resulting adhesive composition may not exhibit any adhesiveness improving effect, and if it is larger than 30 parts by weight, a cured matter of the resulting adhesive composition may be greatly impaired in rigidity and heat resistance.

The cyanoacrylate adhesive composition according to the present invention can be prepared easily by adding predetermined amounts of the foregoing elastomer and core-shell polymer to cyanoacrylate and conducting stirring for several hours usually under heating at 40° C. to 60° C.

Further, to the adhesive composition of the present invention there may be added appropriate amounts of additives which are known as additives for cyanoacrylate adhesives such as filler, extender, crosslinking agent, anionic polymerization retarder, radical polymerization retarder, adhesion improver, water resistance improver, curing accelerator, and coloring material.

EFFECT OF THE INVENTION

The cyanoacrylate adhesive of the present invention has a high shear bond strength, a high peeling bond strength and a high impact bond strength and is superior particularly in hot-cold cycle resistance and heat resistance. Because of these characteristics it is employable also for portions requiring a higher fixing force than that obtained with conventional cyanoacrylate adhesives and for portions requiring bond durability.

EXAMPLES

The present invention will be described below by way of working examples and comparative examples, but it is to be understood that the invention is not limited to those working examples.

The "part" in the following working and comparative examples and the numerical values in the following tables all represent part by weight. Further, the following abbreviations are used in the working and comparative examples:

| * Cyanoacrylate | |
|---|---|
| Methyl α-cyanoacrylate | MCA |
| Ethyl α-cyanoacrylate | ECA |
| Allyl α-cyanoacrylate | ACA |
| Ethoxyethyl α-cyanoacrylate | EECA |
| * Monomer | |
| Butadiene | Bd |
| 2-Ethylhexyl acrylate | 2EHA |
| n-Butyl acrylate | BA |
| Methyl methacrylate | MMA |
| Ethyl acrylate | EA |
| Acrylonitrile | AN |
| Styrene | St |
| Allyl methacrylate | AlMA |
| 1,4-Butylene glycol diacrylate | BGA |
| Divinylbenzene | DVB |
| * Surfactant | |

| -continued | |
|---|---|
| Neocoal P, a product of Dai-ichi Kogyo Seiyaku Co., Ltd. (sodium dioctylsulfosuccinate) | NP |
| Pelex SSL, a product of Kao Corporation | SSL |
| * Others | |
| Deionized water | DIW |
| Sodium hydrogencarbonate | SBC |
| Sodium persulfate | SPS |

Test Methods

Measurement of Weight Average Particle Diameter

The weight average particle diameter of a core-shell polymer was measured using LPA-3000 (a product of Otsuka Denshi K.K.)

Hot-Cold Cycle Resistance

As a test piece was used a degreased, cold rolled steel plate (SPCC-SD) of 100×25×1.6 mm. A portion to be bonded (10×25 mm) was polished with #240 sand paper, then washed and applied with an adhesive. Thereafter, the test piece was put on the portion to be bonded and fixed with a clip. The resulting laminate was allowed to stand for 24 hours in an environment of 23±2° C., 55±5 RH %, to effect bonding. The thus-bonded test piece was then aged 8 and 28 cycles, one cycle being 60° C.×3 hr~−40° C.×3 hr, and thereafter left standing for 24 hours in an environment of 23±2° C., 55±5 RH %, then determined for Lap shear bond strength.

As the Lap shear bond strength, a maximum breaking load was measured at a pulling rate of 10 mm/min, using Tensilon and in accordance with JIS K 6861.

Heat Resistance

A bonding test piece was fabricated in the same way as above. It was then aged at 100° C. for 24 hours, then allowed to stand for 24 hours in an environment of 23±2° C., 55±5 RH %, and thereafter determined for Lap shear bond strength.

Example 1

Preparation of a core-shell polymer A and that of a cyanoacrylate adhesive composition using cyanoacrylate, elastomer A and core-shell polymer A.

Into a 100 ml polymerization vessel equipped with a condenser were fed 427.5 g of DIW, 10.8 g of a 1% aqueous NP solution and 72.5 g of a 1% aqueous SBC solution, and the temperature was raised to 70° C. with stirring under a nitrogen gas stream. 36.0 g of EA was added and dispersed over a period of 10 minutes, then 18.0 g of a 2% aqueous SPS solution was added and reaction was allowed to take place under stirring for 1 hour. Lastly, 1,980 g of DIW was added for dilution to afford a seed latex.

Subsequently, at 70° C., 300.0 g of a 2% aqueous SPS solution was added and 4,314.0 g of the following monomer emulsion was fed continuously over a period of 240 minutes. Thereafter, the temperature was raised to 90° C. and an aging reaction was allowed to proceed for 1 hour to afford a core latex.

| First-step Monomer Emulsion | |
|---|---|
| BA | 2,889.9 g |
| BGA | 14.8 g |

-continued

| First-step Monomer Emulsion | |
|---|---|
| AIMA | 59.3 g |
| 1% NP | 1,050.0 g |
| 1% SBC | 150.0 g |
| DIW | 150.0 g |

Next, the temperature was reduced to 70° C. and polymerization for a shell was conducted.

100.0 g of a 2% aqueous SPS solution was added and 1,800.0 g of the following monomer emulsion was fed continuously over a 180 min. period. Thereafter, the temperature was raised to 90° C. and aging reaction was allowed to proceed for 1 hour.

| Second-step Monomer Emulsion | |
|---|---|
| MMA | 995.0 g |
| BGA | 5.0 g |
| 1% NP | 400.0 g |
| 1% SBC | 100.0 g |
| DIW | 300.0 g |

Thereafter, the temperature was reduced to 30° C., followed by filtration using a stainless steel gauze of 300 mesh, to yield a core-shell graft polymer latex having a weight average particle diameter of 542 nm.

The latex thus obtained was once frozen at −30° C., then melted and thereafter dehydrated using a centrifugal machine, followed by blast drying a whole day and night at 60° C., to give a core-shell graft polymer A.

A cyanoacrylate adhesive composition was prepared in the following manner. 300 g of ECA was weighed into a 500 ml beaker and stirring blades were rotated at 300 rpm by means of a three-one motor into which were then added 30 g of elastomer A (VamacG, a methyl acrylate-ethylene copolymer, a product of Du Pont) and 30 g of core-shell polymer A. Thereafter, the temperature was adjusted to 50° C. using a heater and stirring was conducted for 4 hours. Thereafter, the heater was turned off and stirring was continued for another 4 hours while the temperature was allowed to drop to room temperature to afford a cyanoacrylate adhesive composition.

Examples 2–5

Preparing a cyanoacrylate adhesive composition of elastomer A and core-shell graft polymer A.

Using the compositions shown in Table 2, the same operations as in Example I were performed to yield cyanoacrylate adhesive compositions.

Comparative Examples 1–7

Bond strength of various cyanoacrylate adhesive compositions.

Using ECA and the compositions shown in Table 2, the same operations as in Example 1 were performed to afford cyanoacrylate adhesive compositions as blanks comprising ECA and elastomer A and those comprising ECA and core-shell graft polymer A.

Examples 6–10

Preparation of core-shell graft polymers B, C, D, E and E and how to prepare cyanoacrylate adhesive compositions using them, elastomer A and cyanoacrylate.

Using the monomer compositions shown in Table 1, the same operations as in Example 1 were performed to prepare core-shell graft polymers B, C, D, E and F. Subsequently, using the compositions shown in Table 3, the same operations as in Example 1 were conducted to afford cyanoacrylate adhesive compositions.

Comparative Examples 8–12

Bond strength of cyanoacrylate adhesive compositions using core-shell graft polymers B, C, D, E and F.

Using the compositions shown in Table 3, the same operations as in Example 1 were performed to prepare cyanoacrylate adhesive compositions of core-shell graft polymers B, C, D, E and F.

Examples 11 and 12

Preparation of cyanoacrylate adhesive compositions using core-shell graft polymers A and elastomers B, C.

Using the compositions shown in Table 4, and using elastomer B (an acrylonitrile-butadiene copolymer containing 40 wt % of acrylonitrile) and elastomer C (polyester-urethane elastomer) in place of elastomer A, the same operations as in Example 1 were conducted to afford cyanoacrylate adhesive compositions.

Comparative Examples 13 and 14

Bond strength of cyanoacrylate adhesive compositions using elastomers B and C.

Using the compositions shown in Table 4, and using elastomers B and C, the same operations as in Example 1 were performed to give cyanoacrylate adhesive compositions comprising respectively ECA and elastomer A and ECA and elastomer C.

Examples 13–15

Preparation of cyanoacrylate adhesive compositions using elastomer A and core-shell polymer A.

Using the compositions shown in Table 5, and using MCA, ACA and EECA in place of ECA, the same operations as in Example 1 were performed to afford cyanoacrylate adhesive compositions.

Comparative Examples 15–23

Bond strength of various cyanoacrylate adhesive compositions.

Using MCA, ACA, EECA and the compositions shown in Table 5, the same operations as in Example 1 were conducted to give cyanoacrylate adhesive compositions comprising respectively cyanoacrylate and elastomer A and cyanoacrylate and core-shell polymer A.

TABLE 1

| Core-Shell Polymer | A | B | C | D | E | F |
|---|---|---|---|---|---|---|
| Core/(Intermediate Layer)/Shell Ratio | 75/25 | 75/25 | 75/25 | 60/20/20 | 75/10/15 | 80/20 |
| Core Monomer Composition (w %) | | | | | | |
| BA | 96.3 | 89.5 | 93.5 | | 92.5 | 93.5 |
| EA | 1.2 | 7.0 | 4.0 | 5.0 | 5.0 | 5.0 |
| 2EHA | | | | 54.7 | | |
| Bd | | | | 40.0 | | |
| BGA | 0.5 | 1.0 | 0.5 | 0.15 | 0.5 | 0.5 |

TABLE 1-continued

| Core-Shell Polymer | A | B | C | D | E | F |
|---|---|---|---|---|---|---|
| DVB | | | | | | |
| AIMA | 2.0 | 2.5 | 2.0 | 0.15 | 2.0 | 1.0 |
| Intermediate Monomer Composition (w %) | | | | | | |
| MMA | | | | | 97.8 | |
| BA | | | | 94.0 | | |
| BGA | | | | 2.0 | 0.2 | |
| AIMA | | | | 4.0 | 2.0 | |
| Shell Monomer Composition (w %) | | | | | | |
| MMA | 99.5 | 90.0 | 89.5 | 89.0 | | 75.0 |
| EA | | 10.0 | 10.0 | 10.0 | | |
| BGA | 0.5 | | 0.5 | 1.0 | | |
| AN | | | | | 25.0 | |
| St | | | | | 98.0 | |
| DVB | | | | | | 2.0 |
| Particle Diameter (nm) | 542 | 137 | 268 | 306 | 245 | 263 |

TABLE 4

| | Example | | Comparative Example | | | |
|---|---|---|---|---|---|---|
| | 11 | 12 | 1 | 5 | 13 | 14 |
| ECA | 100 | 100 | 100 | 100 | 100 | 100 |
| Elastomer B | 10 | | | | 10 | |
| Elastomer C | | 10 | | | | 10 |
| Core-Shell Polymer A | 10 | 10 | | 10 | | |
| Hot-Cold Cycle Resistance (MPa) | | | | | | |
| 8 cycles | 14.9 | 11.8 | 9.7 | 7.2 | 7.3 | 7.7 |
| 28 cycles | 15.6 | 9.8 | 6.3 | 7.4 | 8.0 | 5.8 |
| Heat Resistance (MPa) | 11.7 | 11.1 | 7.0 | 9.5 | 7.0 | 3.3 |

TABLE 2

| | Example | | | | | Comparative Example | | | | | | |
|---|---|---|---|---|---|---|---|---|---|---|---|---|
| | 1 | 2 | 3 | 4 | 5 | 1 | 2 | 3 | 4 | 5 | 6 | 7 |
| ECA | 100 | 100 | 100 | 100 | 100 | 100 | 100 | 100 | 100 | 100 | 100 | 100 |
| Elastomer A | 10 | 20 | 30 | 10 | 10 | | 10 | 20 | 30 | | | |
| Core-Shell Polymer A | 10 | 10 | 10 | 20 | 30 | | | | | 10 | 20 | 30 |
| Hot-Cold Cycle Resistance (MPa) | | | | | | | | | | | | |
| 8 cycles | 12.4 | 12.0 | 11.8 | 16.2 | 14.8 | 9.7 | 8.8 | 7.5 | 2.9 | 7.2 | 8.6 | 14.4 |
| 28 cycles | 10.2 | 10.5 | 11.7 | 13.7 | 14.2 | 6.3 | 6.1 | 7.8 | 2.9 | 7.4 | 7.1 | 9.7 |
| Heat Resistance (MPa) | 11.4 | 13.1 | I1.5 | 14.1 | 15.4 | 7.0 | 6.6 | 5.2 | 3.7 | 9.5 | 11.4 | 10.9 |

TABLE 3

| | Example | | | | | Comparative Example | | | | | | |
|---|---|---|---|---|---|---|---|---|---|---|---|---|
| | 6 | 7 | 8 | 9 | 10 | 1 | 2 | 8 | 9 | 10 | 11 | 12 |
| ECA | 100 | 100 | 100 | 100 | 100 | 100 | 100 | 100 | 100 | 100 | 100 | 100 |
| Elastomer A | 10 | 10 | 10 | 10 | 10 | | 10 | | | | | |
| Core-Shell | | | | | | | | | | | | |
| Polymer B | 10 | | | | | | | 10 | | | | |
| Polymer C | | 10 | | | | | | | 10 | | | |
| Polymer D | | | 10 | | | | | | | 10 | | |
| Polymer E | | | | 10 | | | | | | | 10 | |
| Polymer F | | | | | 10 | | | | | | | 10 |
| Hot-Cold Cycle Resistance (MPa) | | | | | | | | | | | | |
| 8 cycles | 12.6 | 14.3 | 12.4 | 11.5 | 15.2 | 9.7 | 8.8 | 7.4 | 8.7 | 7.6 | 8.4 | 12.0 |
| 28 cycles | 9.8 | 12.2 | 9.5 | 10.4 | 15.2 | 6.3 | 6.1 | 7.1 | 8.1 | 6.2 | 8.6 | 11.2 |
| Heat Resistance (MPa) | 10.3 | 11.3 | 10.8 | 10.4 | 12.3 | 7.0 | 6.6 | 7.6 | 9.6 | 7.1 | 7.5 | 9.8 |

TABLE 5

| | Example | | | Comparative Example | | | | | | | | |
|---|---|---|---|---|---|---|---|---|---|---|---|---|
| | 13 | 14 | 15 | 15 | 16 | 17 | 18 | 19 | 20 | 21 | 22 | 23 |
| MCA | 100 | | | 100 | 100 | 100 | | | | | | |
| ACA | | 100 | | | | | 100 | 100 | 100 | | | |
| EECA | | | 100 | | | | | | | 100 | 100 | 100 |
| Elastomer A | 10 | 10 | 10 | | 10 | | | 10 | | | 10 | |
| Core-Shell Polymer A | 10 | 10 | 10 | | | 10 | | | 10 | | | 10 |
| Hot-Cold Cycle Resistance (MPa) | | | | | | | | | | | | |
| 8 cycles | 13.1 | 13.7 | 12.3 | 8.6 | 8.2 | 7.8 | 9.5 | 8.9 | 8.5 | 8.8 | 6.3 | 7.3 |
| 28 cycles | 11.4 | 12.5 | 11.7 | 5.8 | 7.4 | 7.5 | 6.8 | 7.7 | 8.1 | 8.6 | 5.8 | 7.5 |
| Heat Resistance (MPa) | 13.0 | 14.8 | 10.8 | 9.8 | 8.8 | 9.5 | 11.3 | 10.1 | 11.0 | 5.7 | 4.6 | 4.4 |

What is claimed is:

1. A cyanoacrylate adhesive composition comprising (a) a cyanoacrylate monomer, (b) an elastomer, having a glass transition temperature of below −10° C., miscible or compatible with the cyanoacrylate monomer, said elastomer selected from the group consisting of an acrylonitrile-butadiene copolymer and a (meth)acrylic ester lower alkene monomer copolymer and (c) a core-shell polymer having a core of a polymerized alkyl acrylate, wherein the alkyl group has 2 to 8 carbon atoms, and, optionally, a copolymerizable monomer and a shell of a polymer of methyl methacrylate and a monomer copolymerizable therewith, said core-shell polymer being compatible but not miscible with the cyanoacrylate monomer, said core-shell polymer prepared by the steps of freezing a latex; melting said frozen latex; and heat-drying said melted latex.

2. A cyanoacrylate adhesive composition as set forth in claim 1, wherein 0.5 to 30 parts by weight of the elastomer is miscible or compatible with 100 parts by weight of the cyanoacrylate monomer.

3. A cyanoacrylate adhesive composition as set forth in claim 1 wherein said alkyl acrylate of said core polymer is butyl acrylate.

4. A cyanoacrylate adhesive composition as set forth in claim 1 wherein said elastomer (b) is an acrylonitrile-butadiene copolymer.

5. A cyanoacrylate adhesive composition as set forth in claim 1, wherein the core of the core-shell polymer has a glass transition temperature (Tg) of below room temperature, and the shell of the core-shell polymer has a glass transition temperature (Tg) of above room temperature.

6. A cyanoacrylate adhesive composition as set forth in claim 1, wherein the core-shell polymer is prepared by the steps of (1) preparing a latex by seed emulsion polymerization; (2) freezing said latex at a temperature in the range of −5° C. to about −40° C.; (3) melting said frozen latex at a temperature in the range of between 15° C. and 60° C.; (4) dehydrating said melted latex; and (5) drying said dehydrated melted latex at a temperature in the range of 40° C. to about 80° C. to provide a powder.

7. A cyanoacrylate adhesive composition as set forth in claim 1, wherein 3 to 30 parts by weight of the core-shell polymer is compatible with 100 parts by weight of the cyanoacrylate monomer.

8. A cyanoacrylate adhesive composition as set forth in claim 1, wherein the elastomer is a copolymer containing as essential constituent monomers an acrylic ester and/or a methacrylic ester and a lower alkene monomer.

9. A cyanoacrylate adhesive composition as set forth in claim 1, wherein the elastomer is a copolymer containing acrylonitrile and a conjugated diene as essential constituent monomers.

10. A cyanoacrylate adhesive composition comprising (a) 100 parts by weight of a cyanoacrylate monomer, (b) 0.5 to 30 parts by weight of an elastomer having a glass transition temperature of below −10° C. miscible or compatible with the cyanoacrylate monomer said elastomer selected from the group consisting of an acrylonitrile-butadiene copolymer and a (meth)acrylic ester-lower alkene monomer copolymer and (c) 3 to 30 parts by weight of a core-shell polymer having a core of a polymer of an alkyl acrylate wherein the alkyl group has 2 to 8 carbon atoms and, optionally, a copolymerizable monomer and a shell of a polymer of methyl methacrylate and a monomer copolymerizable therewith, said core-shell polymer being compatible but not miscible with the cyanoacrylate monomer, said core polymerized with a crosslinkable monomer present in an amount of 0.2 to 4.0% by weight and a graft monomer present in an amount of 0.2 to 5.0% by weight, both based on the weight of the core, said core-shell polymer formed by the steps of freezing a latex; melting said frozen latex; and heat-drying said melting latex.

11. A cyanoacrylate adhesive composition as set forth in claim 10 wherein said alkyl acrylate of said core polymer is butyl acrylate.

12. A cyanoacrylate adhesive composition as set forth in claim 10, wherein the core of the core-shell polymer has a glass transition temperature (Tg) of below room temperature, and the shell of the core-shell polymer has a glass transition temperature (Tg) of above room temperature.

13. A cyanoacrylate adhesive composition as set forth in claim 10 wherein said elastomer (b) is an acrylonitrile-butadiene copolymer.

14. A cyanoacrylate adhesive composition as set forth in claim 10 wherein said optional copolymerizable core monomer is an alkane polyol polyacrylate or an alkane polyol polymethacrylate.

15. A cyanoacrylate adhesive composition as set forth in claim 10, wherein the elastomer is a copolymer containing as essential constituent monomers an acrylic ester or a methacrylic acid ester and a lower alkene monomer.

16. A cyanoacrylate adhesive composition as set forth in claim 10, wherein the elastomer is a copolymer containing acrylonitrile and a conjugated diene as essential constituent monomers.

17. A cyanoacrylate adhesive composition as set forth in claim 10, wherein the graft monomer is an unsaturated carboxylic acid allyl ester.

18. A cyanoacrylate adhesive composition as set forth in claim 10 wherein said optional copolymerizable core monomer is an alkane polyol polyacrylate or an alkane polyol polymethacrylate.

19. A cyanoacrylate adhesive composition as set forth in claim 10, wherein the core-shell polymer has been separated by a freeze-melting method in the step of recovering the polymer.

20. A cyanoacrylate adhesive composition as set forth in claim 10, wherein the core-shell polymer has a weight average particle diameter of 0.1 to 1 μm.

21. A cyanoacrylate adhesive composition as set forth in claim 10, wherein the crosslinkable monomer is used in the shell of the core-shell polymer in an amount in the range from 0 to 4.0% by weight.

22. A cyanoacrylate adhesive composition as set forth in claim 1, wherein the core-shell polymer has a weight average particle diameter of 0.1 to 1 μm.

* * * * *

UNITED STATES PATENT AND TRADEMARK OFFICE
CERTIFICATE OF CORRECTION

PATENT NO. : 5,994,464
DATED : November 30, 1999
INVENTOR(S) : N. Ohsawa et al.

It is certified that error appears in the above-identified patent and that said Letters Patent is hereby corrected as shown below:

<u>Column 4,</u>
Line 5, "-10ºC. if" should read -- -10ºC. If --

<u>Column 9,</u>
Line 65, "E and E" should read -- E and F --

<u>Column 11,</u>
Line 18, Table 1, Column E: delete "25.0" insert -- 25.0 -- into -- Column F after "75.0".
Line 40, Table 2: "I1.5" should read -- 11.5 --

Signed and Sealed this

Thirtieth Day of July, 2002

Attest:

Attesting Officer

JAMES E. ROGAN
*Director of the United States Patent and Trademark Office*